United States Patent
Ping et al.

(10) Patent No.: US 10,770,968 B1
(45) Date of Patent: Sep. 8, 2020

(54) SWITCHING POWER CONVERTER WITH ADAPTIVE PULSE FREQUENCY MODULATION

(71) Applicant: DIALOG SEMICONDUCTOR INC., Campbell, CA (US)

(72) Inventors: Laiqing Ping, Campbell, CA (US); Nan Shi, Campbell, CA (US); Xiaoyan Wang, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/547,345

(22) Filed: Aug. 21, 2019

(51) Int. Cl.
*H02M 1/42* (2007.01)
*H02M 3/157* (2006.01)

(52) U.S. Cl.
CPC ....... *H02M 1/4225* (2013.01); *H02M 1/4208* (2013.01); *H02M 3/157* (2013.01)

(58) Field of Classification Search
CPC ...... H02M 1/4225; H02M 3/157; H02M 1/08; H02M 3/155–1588
See application file for complete search history.

(56) References Cited

U.S. PATENT DOCUMENTS

| | | | | |
|---|---|---|---|---|
| 8,787,039 B2* | 7/2014 | Shi | ...................... | H02M 1/4258 363/16 |
| 9,461,558 B2* | 10/2016 | Bianco | ................ | H02M 1/4225 |
| 10,103,636 B1* | 10/2018 | Gao | ................... | H05B 41/2853 |
| 10,211,737 B1* | 2/2019 | Costa | .................. | H02M 3/1584 |
| 10,218,279 B2* | 2/2019 | Stracquadaini | ... | H02M 3/33507 |
| 10,418,902 B1* | 9/2019 | Dharmalinggam | ......................... | H02M 1/0061 |
| 2001/0050581 A1* | 12/2001 | Saeki | ........................ | G06F 1/10 327/158 |
| 2008/0315851 A1* | 12/2008 | Akiyama | ............ | H02M 3/1588 323/284 |
| 2010/0283442 A1* | 11/2010 | Nakashima | ......... | H02M 3/1588 323/283 |
| 2011/0267853 A1* | 11/2011 | Yang | .................. | H02M 3/33515 363/56.01 |
| 2012/0056551 A1* | 3/2012 | Zhu | .................... | H02M 3/33507 315/232 |
| 2012/0169313 A1* | 7/2012 | Lee | ..................... | H02M 1/4225 323/282 |
| 2013/0021009 A1* | 1/2013 | Waltman | ............. | H02M 3/1584 323/271 |
| 2013/0088208 A1* | 4/2013 | Noda | .................... | H02M 3/158 323/271 |
| 2013/0285634 A1* | 10/2013 | Bianco | .................. | H02M 3/157 323/283 |
| 2015/0048807 A1* | 2/2015 | Fan | ..................... | H02M 1/4225 323/208 |
| 2016/0276936 A1* | 9/2016 | Gritti | ................... | H02M 1/4258 |
| 2016/0322902 A1* | 11/2016 | Tsuruyama | .......... | H03K 5/2472 |
| 2016/0380530 A1* | 12/2016 | Maruyama | .......... | H02M 1/4225 323/210 |

(Continued)

*Primary Examiner* — Yusef A Ahmed
(74) *Attorney, Agent, or Firm* — Haynes and Boone, LLP

(57) ABSTRACT

An adaptive pulse frequency modulation for a switching power converter is provided that varies the switching frequency across a cycle of a rectified input voltage for the switching power converter From a beginning of the cycle of the rectified input voltage, the switching frequency decreases from a maximum value to a minimum value at a mid-point of the cycle and then increases from the mid-point back to the maximum value at an end of the cycle.

12 Claims, 5 Drawing Sheets

(56) References Cited

U.S. PATENT DOCUMENTS

| | | | | |
|---|---|---|---|---|
| 2017/0155319 A1* | 6/2017 | Deng | .................... | H02M 3/157 |
| 2017/0271991 A1* | 9/2017 | Tsuruyama | ........ | G01R 19/0038 |
| 2017/0373595 A1* | 12/2017 | Huang | .................. | H02M 3/157 |
| 2018/0091041 A1* | 3/2018 | Feng | ................... | H02M 3/1582 |
| 2018/0337607 A1* | 11/2018 | Drda | ................. | H02M 3/33507 |
| 2019/0190279 A1* | 6/2019 | Xu | ...................... | H02M 3/1584 |
| 2019/0222110 A1* | 7/2019 | Tirumala | ................ | H02M 1/15 |

\* cited by examiner

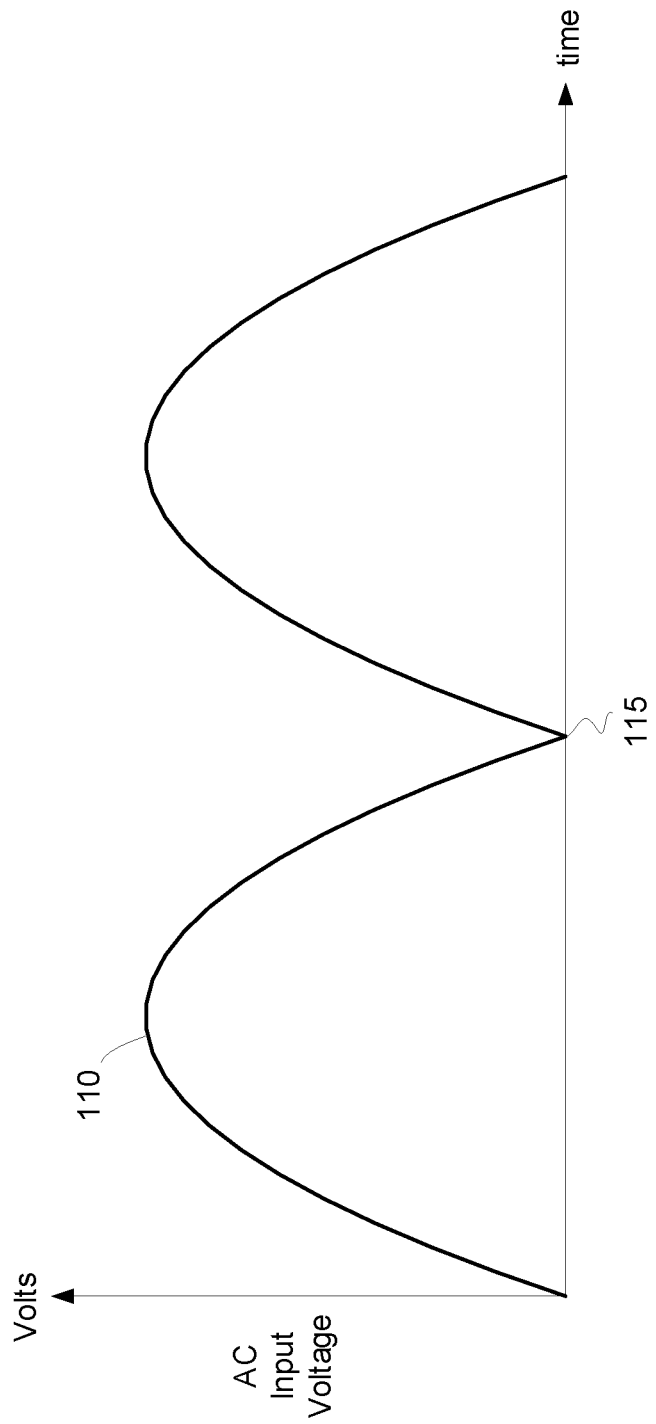
FIG. 1A - Prior Art

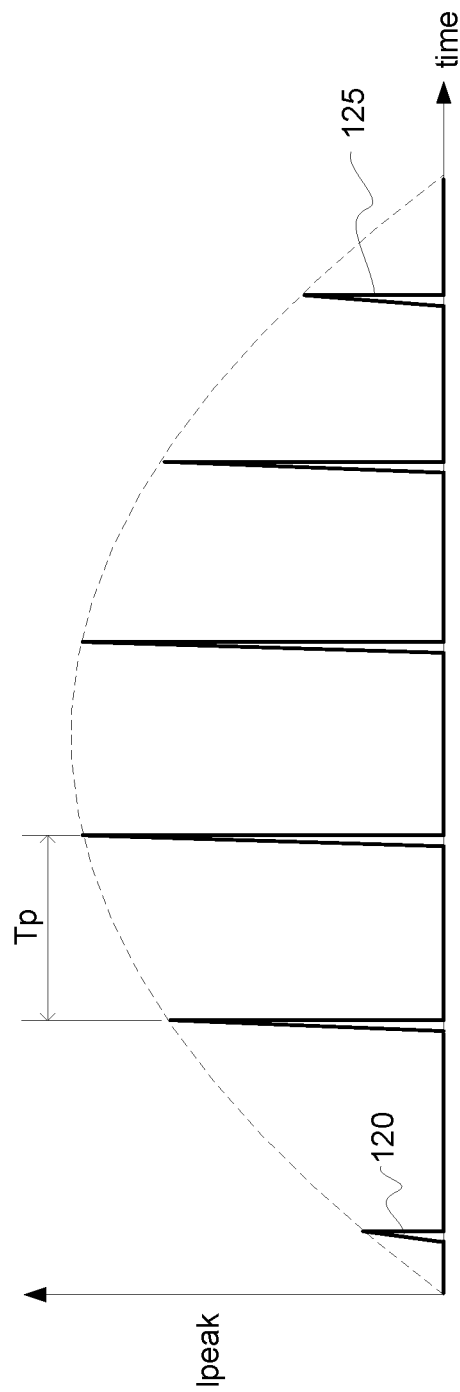
FIG. 1B - Prior Art

SWITCHING POWER CONVERTER WITH ADAPTIVE PULSE FREQUENCY MODULATION

TECHNICAL FIELD

This application relates to switching power converters, and more particularly to a switching power converter with adaptive pulse frequency modulation.

BACKGROUND

Single-stage AC-DC power conversion is a low cost and thus popular power supply topology for applications such as solid-state lighting. An important parameter for a single-stage AC-DC power switching converter is its power factor, which is the ratio of the real power delivered by the AC mains to the single-stage AC-DC switching power converter as compared to the apparent power delivered to the single-stage AC-DC switching power converter. The apparent power is insensitive to the phasing between the input current and voltage in contrast to the real power. The power factor (PF) is thus lowered if the input current and voltage are out of phase. The rectified input voltage to a single-stage AC-DC switching power converter cycles from approximately zero volts to the peak line voltage (e.g., 120 V*1.414 in the US) at twice the frequency for the AC mains. Given this sinusoidal pulsing or cycling of the rectified input voltage, the input current should have a similar profile to achieve a high PF such as by the use of a suitably-modified peak current or constant on time control methodology.

In either of these techniques, the switching power converter regulates the cycling of the power switch transistor so that the input current to the switching power converter during periods of high load has a profile that is in-phase with the profile or envelope for the rectified input voltage. Each cycle of the rectified input voltage begins with a relatively-low voltage (e.g. zero volts) to reach a peak voltage mid-cycle and then falls again to the relatively-low voltage. To achieve a high PF, the peak value for each cycle of the input current to the switching power converter will have a profile or threshold envelope that is similar to the rectified input voltage's envelope. The peak input current will thus cycle in phase with the rectified input voltage so that the peak input current will be relatively small at the beginning of a cycle, pass through a peak mid-cycle, and then fall again to a relatively-small value at the end of each cycle.

In achieve high efficiency, it is also conventional for the controller to alter the modulation mode of the cycling of the power switch transistor depending upon the load. During periods of high load, a pulse width modulation mode may be used. But as the load drops, it is conventional to transition to a pulse frequency modulation mode. While pulse frequency modulation is used, the switching frequency drops as the load decreases and increases as the load increases. The resulting drop in the pulse switching frequency during low-load pulse frequency modulation operation can cause a number of problems. For example, the switching frequency for the cycling of the power switch transistor may enter the audible range. In addition, the switching frequency is independent of the AC mains cycle that drives the sinusoidal profile for the rectified input voltage. At the beginning and end of each cycle for the rectified input voltage, it is desirable for the peak current for each cycle of the power switch transistor to be relatively small so that the profile of the input current to the switching power converter is in in-phase with the envelope of the rectified input voltage. But the peak current must also be responsive to the output voltage. To maintain the output voltage within regulation, the peak current must be undesirably high during the beginning and end of each cycle of the rectified input voltage (the zero-crossing times for the AC mains input voltage). Conventional pulse frequency modulation during low load conditions thus suffers from a reduced power factor due to the need to increase the peak current for the power switch in the vicinity of the zero-crossing times for the AC mains input voltage.

Accordingly, there is a need in the art for single-stage power converters having robust power factor correction during pulse frequency modulation operation.

SUMMARY

To improve the power factor while also keeping the output voltage in regulation, an adaptive pulse frequency modulation is provided in which the switching frequency is decreased as the cycles of the power switch transistor progress from the beginning of a cycle of the rectified input voltage to a mid-point of the rectified input voltage cycle. The switching frequency then increases from the mid-point of the rectified input voltage cycle to the end of the cycle in a symmetric fashion to the first half of the cycle. Due to the increase in switching frequency near the zero-crossing times that demarcate the beginning and end of the cycle, the corresponding relatively small pulses of input current to the switching power converter are relatively numerous as compared to what would result from a conventional pulse frequency modulation. The envelope for the input current to the switching power converter may thus be proportional to the envelope for the rectified input voltage yet the output voltage for the switching power converter is maintained in regulation.

As is conventional in pulse frequency modulation of a switching power converter, a feedback loop generates a control signal based upon an error between the output voltage and a desired value for the output voltage. In a conventional switching power converter, the resulting control signal would be mapped into a switching frequency that would be relatively static across the rectified input voltage cycle. But in the switching power converters disclosed herein, the control signal is instead mapped into a proportionality constant that is used as follows. During each cycle of the power switch transistor, the on-time of the power switch transistor is followed by a reset time in which all the output current from the inductor in a DC-DC switching power converter (or from a secondary winding in a transformer for an isolated switching power converter such as a flyback converter) decreases to zero. The reset time is followed by an idle delay period in which the power switch transistor is not cycled since the conduction mode disclosed herein is discontinuous. To generate an instantaneous switching frequency for each cycle of the power switch transistor, a controller for the switching power converter may observe the on-time and the reset time and then set the following idle delay period as a function of the on-time, the reset time, and the proportionality constant.

These advantageous features may be better appreciated through a consideration of the detailed description below.

BRIEF DESCRIPTION OF THE DRAWINGS

FIG. 1A illustrates the rectified input voltage sinusoidal envelope across two consecutive cycles of the rectified input voltage.

FIG. 1B illustrates the peak input current envelope across a cycle of the rectified input voltage in which the peak input current envelope is proportional to the rectified input voltage envelope and in which pulse frequency modulation is used to cycle the power switch transistor at a relatively low switching frequency due to low-load conditions.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 2:
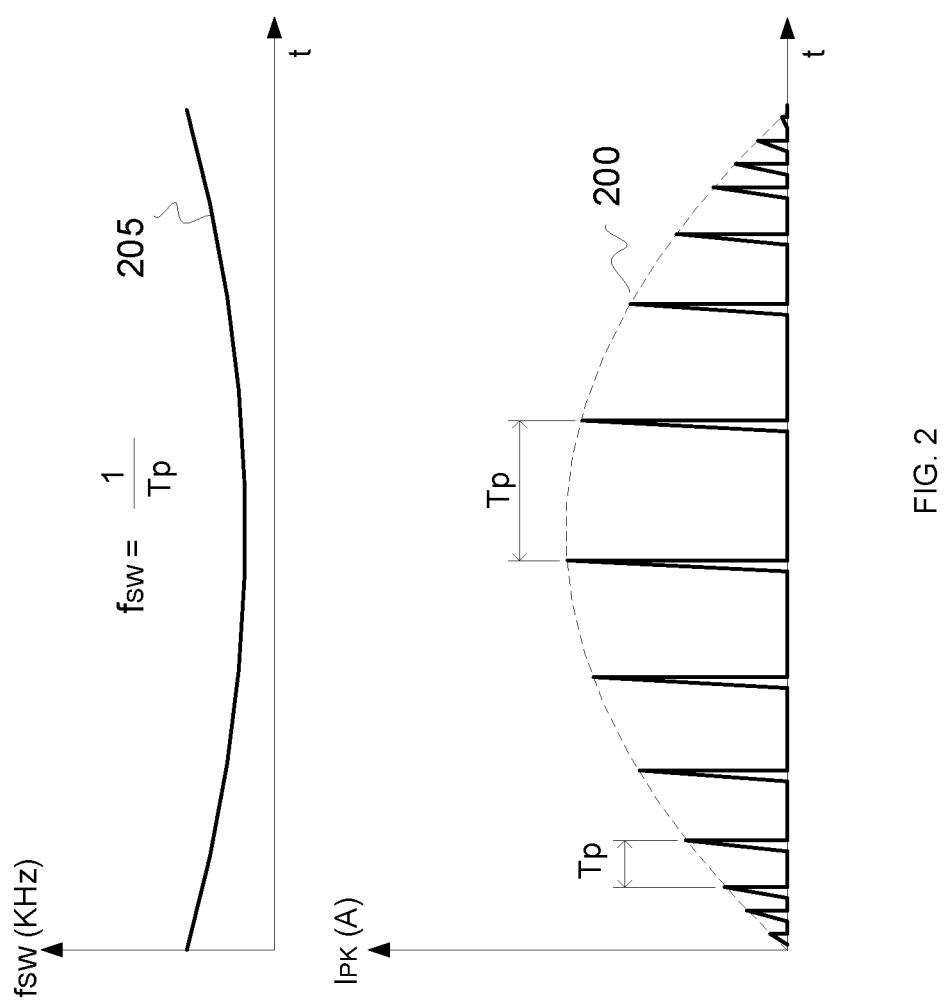
FIG. 2 illustrates the peak input current envelope for a cycle of the rectified input voltage in which an adaptive pulse frequency modulation is used to cycle the power switch transistor and also illustrates the switching frequency for the cycle of the rectified input voltage in accordance with an aspect of the disclosure

To improve the power factor during low-load pulse frequency modulation, it is conventional that the peak input current to the switching power converter in each cycle of the power switch transistor be proportional to the rectified input voltage to the switching power converter. For brevity, the rectified input voltage will be referred to simply as the input voltage in the following discussion. At the beginning of a cycle for the input voltage, the input voltage is relatively low. The peak input current at that time would thus also be relatively low. In the mid-point of the input voltage cycle, the input voltage reaches a peak value. The peak input current would thus also be at its highest value at the mid-point of the cycle whereas the peak input current would again be relatively low at the end of the cycle.

The switching power converter controllers disclosed herein also cycle the power switch transistor so that the peak input current is proportional to the input voltage. But as noted earlier, such a proportionality must typically be violated during light-load pulse frequency modulation (PFM) operation. In such light-load PFM operation, the switching frequency is relatively slow since it drops proportionally to the load. There are thus relatively few pulses of the power switch transistor across a cycle of the input voltage during light-load PFM operation. In a conventional switching power converter, the peak current for the power switch cycles in the vicinity of the AC mains zero-crossing times (the beginning and end of each input voltage cycle) would have to be increased, which lowers the power factor. To solve this problem, a switching power converter is disclosed that implements an adaptive pulse frequency modulation operation in the presence of relatively-light loads. In this adaptive pulse frequency modulation, the switching period for the power switch transistor is shortened in the vicinity of the zero-crossing times for the AC mains input voltage.

The resulting adaptive pulse frequency modulation is quite advantageous because the output voltage may be kept in regulation due to the increased number of pulses of the power switch transistor in the vicinity of the zero-crossing times yet those pulses may have the lowered peak input currents that improve the power factor. In addition, the variation of the pulse frequency modulation across the cycle of the input voltage helps prevent or reduces switching frequencies in the audible noise bandwidth.

An example of the input voltage profile or envelope 110 across two cycles is shown in FIG. 1A. In each cycle, the input voltage rises to a maximum value mid-cycle. A zero-crossing time 115 separates the two cycles. The peak input current for each cycle of the power switch transistor should match envelope 110 for improved power factor. But with conventional PFM the switching frequency would be substantially constant and relatively slow across each cycle of the input voltage for low-load operation such that the conventional shaping of peak input current to match envelope 110 cannot maintain the output voltage in regulation. This shaping of the peak input current along with conventional pulse frequency modulation is shown in FIG. 1B for a single input current cycle (which also corresponds to an input voltage cycle). Since the switching frequency for the cycling of the power switch transistor is substantially constant across the cycle, the switching period Tp is constant between current pulses. Due to the relatively low switching frequency, the switching period Tp is relatively large so that there are relatively few pulses of the input current across the input current cycle. There is thus just one pulse 120 within the first approximately 20% of the cycle and one pulse 125 within the last approximately 20% of the cycle. Due to the current shaping to the input voltage profile, pulses 120 and 125 are relatively weak such that the output voltage for the corresponding switching power converter cannot be maintained in regulation as only two relatively weak pulses of input current are performed over approximately 40% of the input current cycle.

To provide a robust power factor yet also be able to maintain the output voltage in regulation, the adaptive pulse frequency modulation disclosed herein increases the switching frequency at the zero-crossing times (the beginning and end of each input voltage cycle) as shown for a peak input current envelope 200 in FIG. 2. The switching period Tp is thus becomes relatively large in the vicinity of the mid-cycle but decreases near the beginning and end of the cycle. The resulting switching frequency (fsw) profile 205 for the input voltage cycle is also shown in FIG. 2. The switching frequency is inversely related to the switching period Tp so that the switching frequency is increased as the time to the beginning or end of the cycle is decreased. Conversely, the switching frequency lowers to a minimum value at the mid-point of the cycle.

Figure 3:
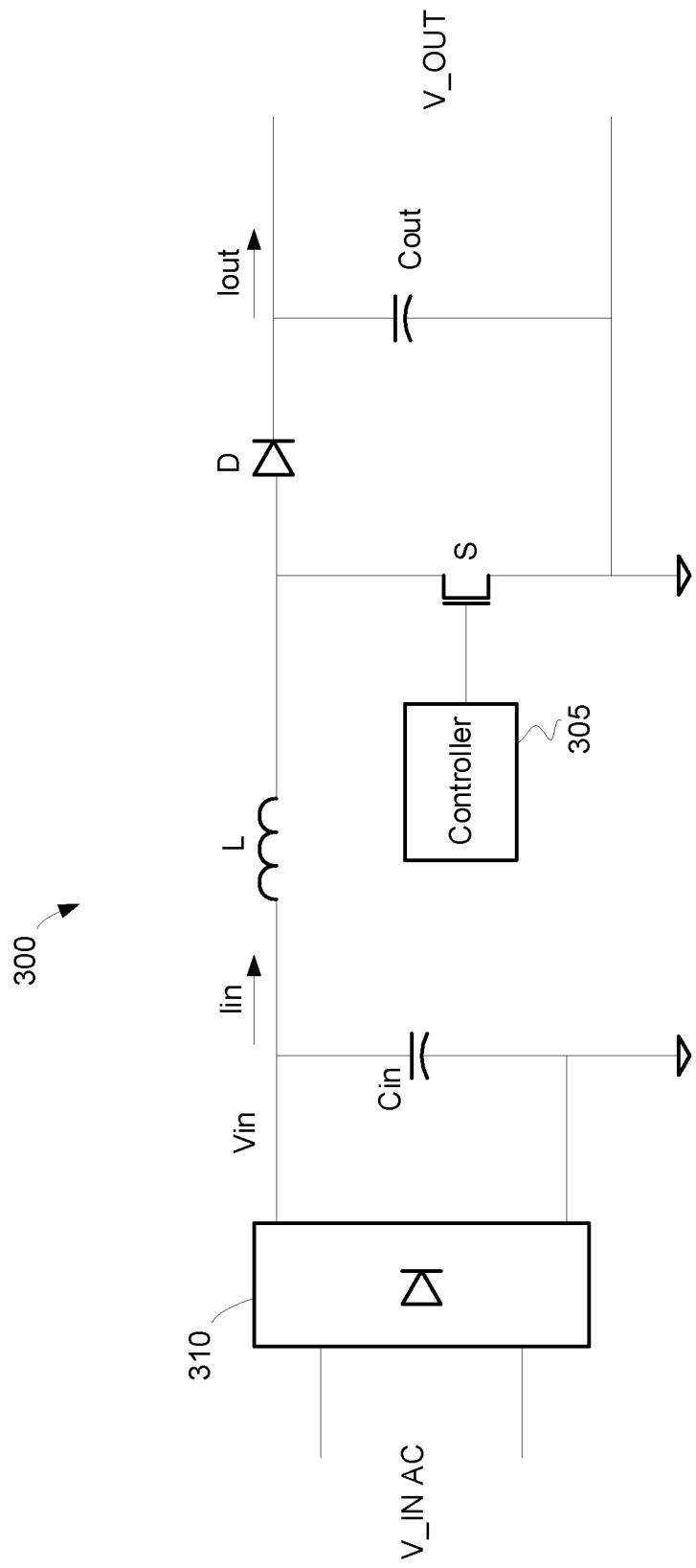
FIG. 3 illustrates an example boost converter including a controller configured to implement an embodiment of the adaptive pulse frequency modulation in accordance with an aspect of the disclosure.

Any suitable switching power converter may practice the adaptive pulse frequency modulation disclosed herein. An example boost converter 300 is shown in FIG. 3 having a controller 305 configured for an embodiment of the adaptive pulse frequency modulation is shown in FIG. 3. A bridge rectifier 310 rectifies an AC mains input voltage (V_INAC) to form the rectified input voltage (Vin) on an input voltage rail. For each half-cycle of the AC mains input voltage, the rectified input voltage will have a cycle as discussed with regard to FIG. 1A. An input capacitor Cin stores and filters the rectified input voltage. Controller 305 regulates an output voltage (V_OUT) by modulating the cycling of a power switch transistor S. A terminal (e.g, a source terminal) of the power switch transistor is tied to ground whereas a remaining terminal (e.g., a drain terminal) couples to the input voltage rail through an inductor L. While the power switch transistor is cycled on, an input current (In) flows through the inductor and through the power switch transistor into ground. During this on-time, an output diode D1 is reversed biased to prevent an output current (Iout) from flowing out of the boost converter to charge an output capacitor Cout with the output voltage. When the power switch transistor is cycled off, the output diode becomes forward biased so that the inductor freewheels to drive the output current and charge the output voltage. In alternative embodiments, the output diode may be replaced with a synchronous rectifier switch transistor.

Figure 4:
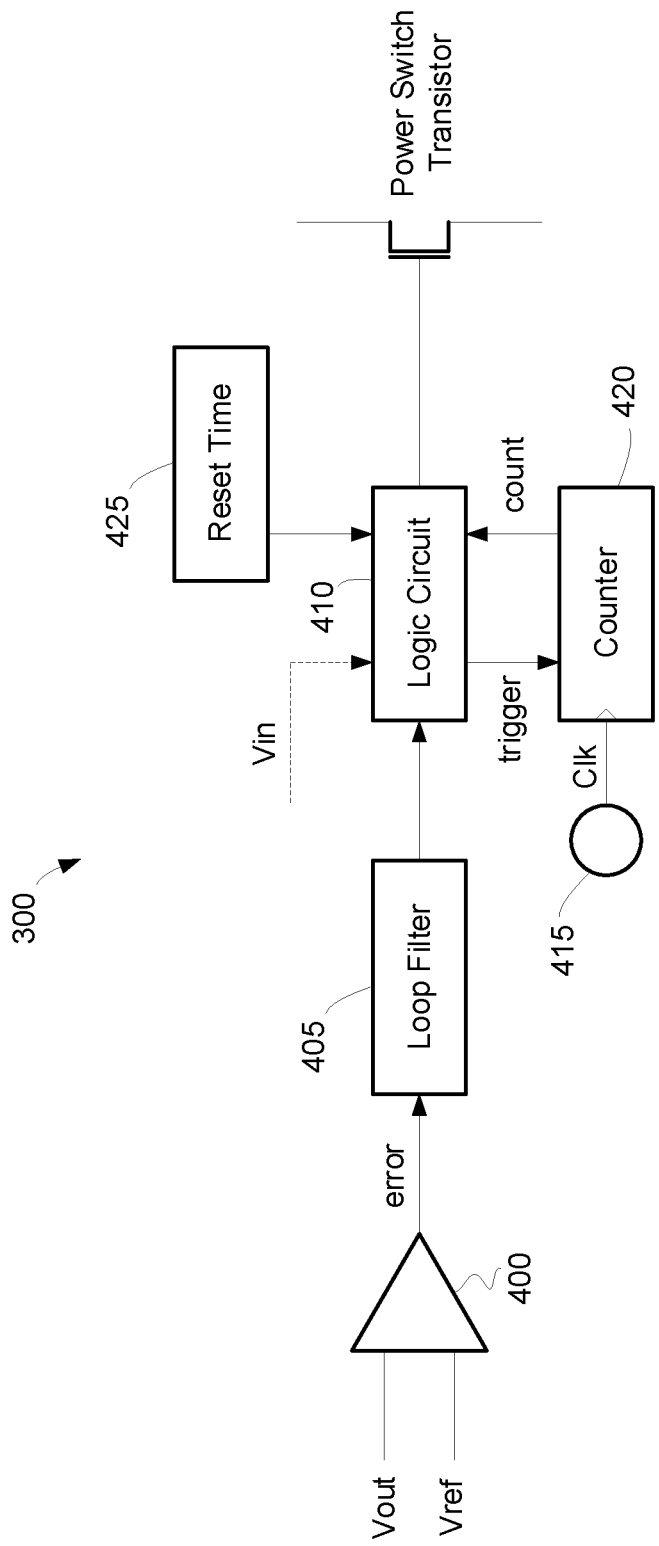
FIG. 4 illustrates the controller of FIG. 3 in more detail.

An embodiment of controller 300 is shown in more detail in FIG. 4. An error amplifier 400 compares the output voltage to a desired value of the output voltage (Vref) to generate an error signal that is filtered by a loop filter 405 to form a control signal voltage Vc. Error amplifier 400 and loop filter 405 form a feedback loop circuit that may be implemented either in the analog domain or in the digital domain. In a digital domain implementation, the output voltage and the reference voltage are digitized. The error amplifier would then be replaced by an adder that subtracts the digitized reference voltage from the digitized output voltage to form a digital error signal. The loop filter would then be a digital loop filter in such a digital implementation. Regardless of whether the feedback loop circuit is implemented in the digital or analog domain, the control signal voltage would be mapped into a switching frequency for pulse frequency modulation operation in a conventional controller (note that the power converters disclosed herein are assumed to be driving relatively-light loads so that pulse frequency modulation is invoked). In controller 300, however, a logic circuit 410 maps the control signal voltage into a proportionality constant instead of a switching frequency. In one embodiment, logic circuit 410 is a microcontroller.

The logic circuit 410 also generates an on-time for the power switch transistor that is timed by a timer such as implemented by a counter 420 that counts responsive to cycles of a clock signal from a clock source 415. Those of ordinary skill in the art will appreciate that the detection of the reset time may be performed using one of several known techniques. The detection of the reset time by a reset time detection circuit 425 will thus not be discussed in detail herein. Counter 420 times both the on-time period for the power switch transistor and also the reset time. Based upon the proportionality constant, logic circuit 410 calculates the delay period ($T_{DELAY}$) following the reset time as follows:

$$T_{DELAY}=(T_{ON}+T_{RESET})\times\text{Ratio}-(T_{ON}+T_{RESET})$$

where $T_{ON}$ is the on-time, $T_{RESET}$ is the rest time, and Ratio is the proportionality constant.

The calculation of the delay period may be carried out on a pulse-by-pulse basis across the input current cycle. Alternatively the delay period may be applied to a group of pulses (e.g., a pair of pulses) and then updated for a subsequent group of pulses. Regardless of how the delay period is updated, logic circuit 410 may use a constant on-time to achieve an input current envelope that will be proportional to the rectified input voltage envelope. Alternatively, logic circuit 410 may calculate a peak current for each cycle of the power switch transistor as a function of the input voltage (Vin). The input voltage is thus an optional parameter for logic circuit 410.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A controller for controlling a cycling of a power switch transistor in a switching power converter, the controller comprising:
    a feedback loop circuit including an error amplifier configured to generate an error signal responsive to an error between the output voltage and the desired value and including a loop filter configured to filter the error signal to form a control voltage signal; and
    a logic circuit configured to generate a proportionality constant responsive to the control voltage signal, wherein for each cycle of the power switch transistor, the logic circuit is configured to switch on the power switch transistor for an on-time and to switch off the power switch transistor during a reset period followed by a delay period, and wherein the logic circuit is further configured to set the delay period to equal a product of a sum of the on-time and the reset period and the proportionality constant minus the sum of the on-time and the reset period.

2. The controller of claim 1, wherein the switching power converter is a boost converter.

3. The controller of claim 1, wherein the controller further comprises a reset detection circuit configured to detect the reset period.

4. The controller of claim 1, wherein the logic circuit is further configured so that the on-time for each cycle of the switching power transistor is a constant.

5. The controller of claim 1, wherein the logic circuit is further configured to calculate a peak current that is proportional to an input voltage for each cycle of the switching power transistor.

6. The controller of claim 1, wherein the logic circuit comprises a microcontroller.

7. The controller of claim 1, wherein a switching frequency for the power switch transistor has a minimum at a mid-point of a rectified input voltage cycle.

8. A method for controlling a cycling of a power switch transistor in a switching power converter, comprising:
    generating a proportionality constant responsive to an error between an output voltage for the switching power converter and a desired value for the output voltage;
    switching on the power switch transistor for an on-time for a first cycle of the power switch transistor;
    after the on-time, measuring a reset time for the switching power converter;
    calculating a delay period responsive to a product of a sum of the on-time and the reset time and the proportionality constant and a subtraction of the sum of the on-time and the reset time from the product;
    waiting for an expiration of the delay period after the reset time before beginning a second cycle of the power switch transistor.

9. The method of claim 8, wherein the on-time is constant for the first cycle of the power switch transistor and for the second cycle of the power switch transistor.

10. The method of claim 8, wherein generating the proportionality constant comprises generating an error signal in an error amplifier responsive to the error between the output voltage and the desired value for the output voltage.

11. The method of claim 10, wherein generating the proportionality constant further comprises:
    filtering the error signal in a loop filter to form a control voltage signal; and mapping the control voltage signal into the proportionality constant.

12. The method of claim 8, wherein measuring the reset time comprises measuring when an inductor current falls to zero following the on-time.

* * * * *